June 5, 1956        A. MOSER        2,748,958
DEFLECTOR MEANS FOR HARVESTER DELIVERY CHUTE
Filed Sept. 21, 1953
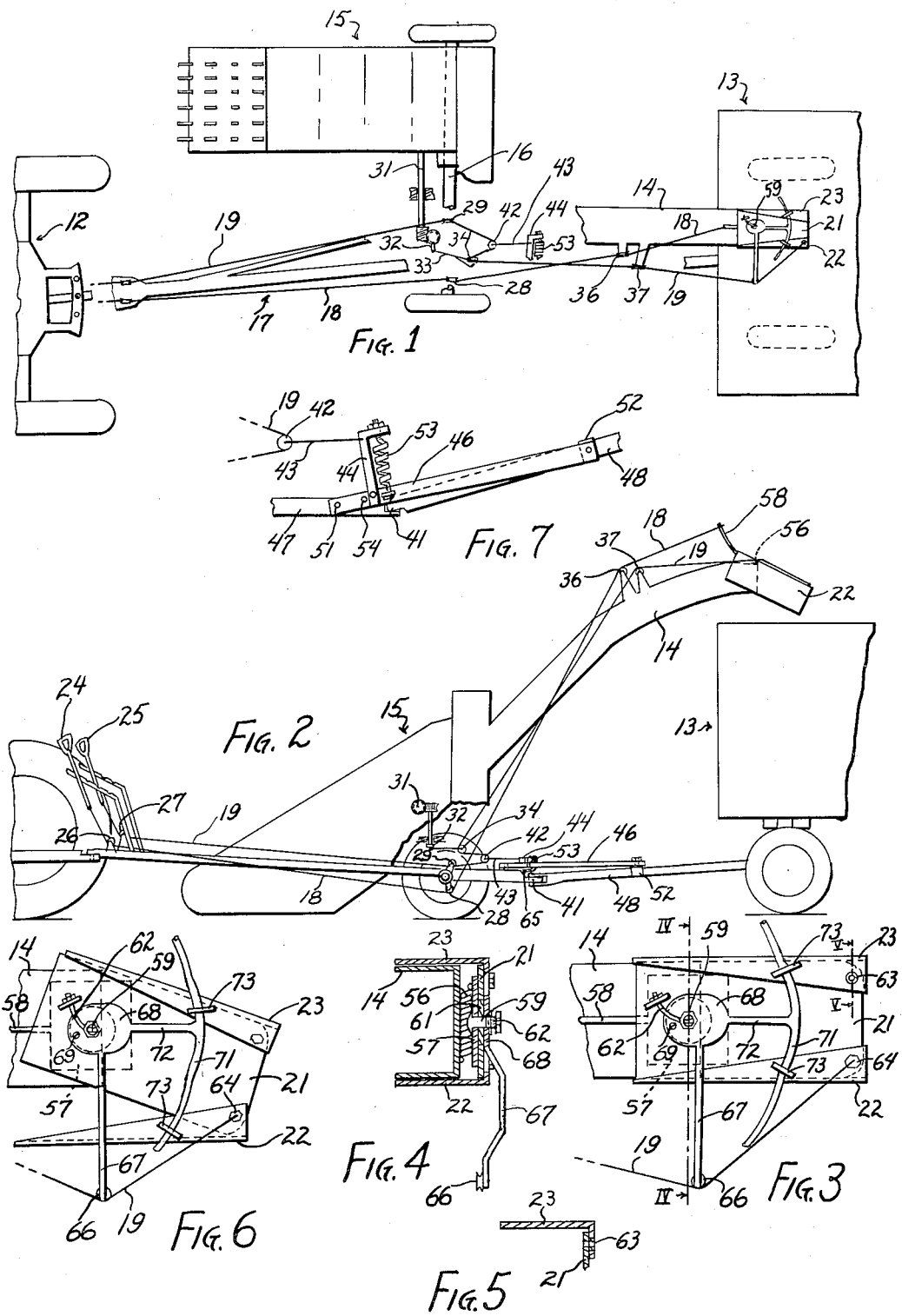

United States Patent Office 2,748,958
Patented June 5, 1956

2,748,958
DEFLECTOR MEANS FOR HARVESTER DELIVERY CHUTE

Anthony Moser, Hales Corners, Wis.

Application September 21, 1953, Serial No. 381,188

18 Claims. (Cl. 214—42)

This invention relates to agriculture harvester apparatus and particularly to equipment for evenly spreading silage blown from the harvester into a wagon.

In harvesting forage from a windrow and blowing the chopped silage into a trailing wagon the problem of properly loading the wagon has long been recognized. However, an adequate solution to this problem is not available. Baffles have been provided for directing silage from the harvester delivery chute into the wagon, but such deflectors are unsatisfactory for many reasons. As the end of the chute is relatively high, control linkage is provided to move the silage baffles attached to the end of the chute and extends therefrom to a lower point on the harvester so as to be able to be reached by the operator. Forage harvesters generally have draft means which carry crop gathering means in pivotable relation about an axis thereof, whereby the crop gathering means may rise and drop to pass over rocks and ground elevation changes as well as be adjusted with respect to the ground level for cutting different crops. And it has been considered necessary to position the end of the control linkage on the crop gathering means of the harvester and not on the draft means so that the baffle positions are not affected by pivoting of the crop gathering means. But such positioning of the control linkage involves great hazard and risk of the operator's safety. He must step and reach near dangerous operating parts. Further, there is considerable inconvenience to the operator as the control linkage is inaccessible when he is driving the tractor which pulls the harvester.

An object of this invention is to provide means to effect even spreading of silage blown from a harvester delivery chute with control linkage safely and easily accessible to the operator from the tractor seat. Delivery chute silage deflectors that have been provided do not properly automatically affect distribution of silage into the wagon and another object of this invention is to provide an improved silage deflector means for the delivery chute to evenly spread silage in a wagon. And another object is to provide a control linkage that automatically effects spreading of the material.

Still another problem involved in adequately blowing silage into a wagon results from the wagon being hitched to the harvester and movable with respect thereto from left to right laterally of a line directly rearward of the delivery chute. Therefore, another object of this invention is to provide means to effect automatic adjustment or compensation of the silage spreading means when the wagon turns with respect to the harvester to which it is hitched for turns of the wagon whether slight or quite sharp. Still another object of this invention is to provide an improved control linkage for silage spreading means of forage harvesters, effective in response to turns of the trailing wagon in any direction. In this connection it is also an object of this invention to prevent the control linkage of the silage deflectors from being overloaded and broken.

Still another object of this invention is to provide an improved silage deflector means for harvester delivery chutes to spread silage in the trailing wagon.

And still another object is to provide improved delivery chute silage deflector means that is movable without clogging because of dirt or small silage particles.

These and other objects and advantages of this invention will be apparent to those skilled in the art from a consideration of the following description taken in conjunction with the accompanying drawing, in which;

Fig. 1 is a plan view of agriculture apparatus embodying this invention and includes a harvesting machine with parts broken away to better show the invention;

Fig. 2 is an elevational view of the apparatus as is shown in Fig. 1, also with parts of the harvester broken away;

Fig. 3 is an enlarged plan view of the silage deflector means attached to the end of the harvester delivery chute. The deflector means is shown disposed directly rearward;

Fig. 4 is a sectional view of the deflector means of Fig. 3 taken along line IV—IV;

Fig. 5 is an enlarged sectional view taken along line V—V of Fig. 3;

Fig. 6 is an enlarged plan view similar to that of Fig. 3 with the deflector means turned to deflect silage in the left rearward direction; and Fig. 7 is an enlarged plan view of the preferred embodiment of an automatic compensating means and an overload release for the deflector means control linkage, effective when the trailing wagon moves with respect to the end of the delivery chute.

The drawing diagrammatically shows a forage harvester drawn by a tractor 12 with a wagon 13 trailing behind the harvester. The wagon is to be loaded with silage blown by the harvester. A delivery chute 14 extends rearwardly of the harvester overhanging the front edge of the wagon, and silage spreading means is attached to the end portion of this delivery chute. A crop gathering means 15 of the forage harvester is conventionally pivoted about axis 16 that is carried by the harvester draft means 17. Thus there may be relative movement of the crop gathering means relative to the draft means. Pivoting about the draft axis results when the front edge of the crop gathering means is raised and lowered either by deliberate action of the operator or in response to its engagement with ground bumps or stones.

The silage spreading means comprises a baffle or downplate 21 hinged to the delivery chute to pivot about a horizontal axis transverse the end of the chute, two vertically disposed plates 22, 23 suitably connected to the end of the delivery chute that they may alternately be a sidewise baffle disposed oblique to the delivery chute, adjustable control linkage extending from those baffles at the rear of the harvester to a position at the front of the harvester easily accessible to the operator in the tractor seat, and means for automatically varying the control linkage to alternately dispose the side baffles oblique to the chute.

One end of cable 18 is connected to move downplate 21, and the opposite end thereof is connected to handle 24 just to the rear of the tractor seat; whereas, one end of cable 19 is connected to move the vertical side plates, and the opposite end thereof is connected to handle 25. Both these handles are carried by the forward harvester tongue of the draft means, just short of the hitch to the tractor draw bar. These handles may be moved independently of each other to different position to move the connected baffles. Preferably, the handles are each supported above pulleys 26 and 27 through which cables 18 and 19, respectively, are roved to provide a downward pull on the handles holding them in the selected notched positions.

The cable control linkage includes means to prevent the above mentioned relative movement of the crop gathering means affecting the baffle positions. The intermediate portion of each cable is brought substantially to the harvester pivot axis 16. The effective length of the cable is independent of that relative movement and the highly desired safety and accessibility features of having the cable handles within reach of the tractor seat at the opposite end of the harvester from the delivery chute baffles is retained. In the illustrated embodiment this means comprises pulleys 28 and 29 attached to the harvester draft means near axis 16 having cables 18 and 19, respectively, passing through them. Cables 18 and 19 are shown as passing over pulleys 36 and 37, respectively, on the delivery chute.

Then there is means included in the control linkage to automatically alternately dispose the side baffles oblique to the chute and silage discharged therefrom. Preferably, this automatic operation is provided by power drive means of the harvester. This means is illustrated as including shaft 31 rotating crank 32 through a worm gear. Crank 32 has a swivel link suitably connected, as by cord 33, to pulley 34 through which cable 19 passes in a manner whereby cable 19 is always tensioned by pulley 34. This crank is continuously rotated moving the connected pulley, 34, to vary the effective cable length between pulley 29 at axis 16 and the spreader means at the end of the chute. In the illustrated embodiment, the maximum effective length of cable 19 exists when pulley 34 is disposed that the direction of the cable from pulley 37 on the delivery chute is a straight line to pulley 29 near pivot axis 16. That effective length is shortened when pulley 34 is moved so that the direction of the cable is off from that straight line. Preferably, crank 32 moves pulley 34 in a direction forward of the straight line from pulley 37 to pulley 29, thereby creating an offset non effective component of the cable length to shorten the effective cable length and move the silage sidewise baffles.

The wagon is conventionally hitched to the harvester at 41, and being an articulated joint, the wagon has movement relative to the harvester. That relative movement is a substantially continuous action as the harvester is moved along a windrow and is a maximum when sharp turns are made. The illustrated embodiment of this invention embodies means in the control linkage to compensate for changes in the position of the wagon relative to the harvester to move the sidewise baffles so that silage is always delivered to the wagon. Without this compensating means the silage would be blown over the side of the wagon when these turns are made.

Reference to this relative movement of the wagon hereinafter will be considered as left and right of a directly rearward position.

The illustrated compensating means includes normally non effective reserve portion of cable 19 and means for varying the length of that reserve portion in response to movement of the wagon with respect to the harvester. This normally non effective, reserve length of cable 19 is shown between pulleys 29 and 34 offset from the effective length of the cable. In the embodiment shown substantially only the double back cable portion extending laterally is non effective. Most of the vertical length of that doubled back portion of the cable actually fills the gap between pulleys 29 and 34 and constitutes part of the effective cable length. The lateral reserve portion is offset from the effective cable portion in a direction opposite to that of the automatic crank operated means.

The doubled back cable portion passes around pulley 42, and this pulley is connected to means that responds to movement of the wagon relative to the harvester. Pulley 42 is thereby moved to lengthen or shorten the reserve non effective portion and conversely to vary the effective length of the cable causing the side baffles to be moved to vary the direction in which silage is deflected. Pulley 42 is connected by strap 43 to arm 44 of bridging bar 46. This bar is connected to the harvester draw bar 47 of the draft means and to wagon tongue 48 by means to cause it to move pulley 47 only in response to relative movement of that draw bar and tongue. In this instance one end of the bar is pivotably connected at 51 to the draw bar and the opposite end has a swiveled yoke 52 slidably disposed over the wagon tongue. Thus, the bar is free to turn in a horizontal plane about either end.

Also included in the illustrated embodiment is an overload release means to prevent breakage of control cable 19 when it is shortened to move a baffle to a maximum position as when the wagon turns to the left with respect to the harvester. Arm 44 is pivotably connected at one end to bridging bar 46 with spring 53 adjustably connected between the other end of the arm and the bar, the spring tension being adjusted to counterbalance the pull of the cable on pulley 42. If the wagon makes too great a turn with respect to the harvester, arm 44 pivots on the bridging bar and as spring 53 stretches, thereby protecting the cable from breakage.

A stop is located on the bridging bar near the pivoted end of the arm as a convenience for attaching and adjusting the spring. The bridging bar preferably is made in two parts and hinged to pivot in the vertical plane as well as have movement in the horizontal plane. The rear part of the bridging bar includes means, shown as stop 65 near the hinge point aligned with the hitch 41, that abuts the front part of the bar limiting the degree to which the rear part may move downwardly, preventing the rear part of the bridging bar from hitting the ground when the harvester is moved backward as in preparation to be hitched to the wagon.

The silage baffle means is illustrated as a unit connected to the end of delivery chute 14. The unit includes a double hinge arrangement permitting the baffle plates to be moved about two different axes. Both hinged plates are biased to one extreme position so that the cables are adaptable to pull the baffle plates against the bias means to move them to their opposite extreme positions.

Downplate 21 is hinged at 56 about an axis that extends horizontally transverse the delivery chute. This hinge is shown as constituted of a torsion spring surrounding the hinge pivot to bias and rotate hinge plate 57. Lever 58 extends from hinge plate 57 for a short distance forwardly toward the tractor, and cable 18 is attached to its forward end that the hinge plate can be moved against the spring bias. Preferably, this lever is curved upwardly to improve the effective force component of the cable pull. Hinge plate 57 is suitably attached to the spring and thereby to the chute so as not to move with respect thereto except about the transverse hinge axis.

Hinge plate 57 carries fast thereon bolt 59 as a second hinge axis disposed at an angle of 90 degrees to the axis about which hinge plate 57 pivots. Downplate 21 is rotatably carried on the hinge plate through means whereby the downplate may turn left or right while the hinge plate and bolt 59 are stationary with respect to that movement of the downplate.

This means for rotatably connecting the downplate to the hinge plate is preferably made so that dirt, small grain or other particles will not clog or bind the parts. This connecting means includes a raised round washer 61 on the hinge plate journaled in a circular opening in the downplate. The downplate is free to rotate on this round washer as a bearing. As mentioned above, since the baffles are cable operated and biased to one extreme position, in the illustrated instance extreme right counterclockwise position. The biasing means is spring 62, one end of which is fixed to chute 14 by being clamped in the split end of bolt 59. The other end of this spring is movable with respect to the chute by being attached by any suitable clamping means to downplate 21. The normal action of this spring is to rotate downplate 21 to its extreme right position.

Side plates 22 and 23, while being vertically disposed baffles to alternately deflect silage to the left or right, are flanged to partly overlay opposite longitudinal side portions of downplate 21. And each of the side plates is pivotally connected to the downplate near the rear corners thereof. As with the pivot connection of the downplate to the hinge plate, round washer 63 is carried on the downplate and is journaled in the flanged side plates. A bolt extends through the downplate and washer 63 journaled in the side plates. Bolt 64 extends through side plate 22 and clamps the end of cable 19.

That cable is arranged that its pull has a relatively large force component acting to pull at bolt 64 to turn the downplate and side plates against the action of spring 62. For easily accomplishing this, cable 19 is passed over pulley 66 disposed to one side, the left, of pivot axis of bolt 59. The distance to the side of the bolt axis is sufficient that the direction of the cable pull on the baffle plates is generally in line with the direction in which bolt 64 moves. Pulley 66 is illustrated as carried at the end of arm 67 lateral of stationary member 68 to which it is affixed. Preferably this stationary member is oblong extending more to the rearward of bolt 59 to take some of the force of silage hitting the downplate when it is disposed at a downward oblique angle to the chute. Screw 69 is passed through stationary member 68, washer 61 and hinge plate 57 keeping those parts and pivot bolt 59 immobile with respect to the chute.

The preferred embodiment also includes means provided to prevent the side plates from wearing on the delivery chute and to firmly reinforce the side plate and downplate against which silage hits as it is discharged from the chute. For this purpose, the illustrated embodiment shows guide rod 71 with integral back up bar 72 connecting it to stationary member 68. This guide rod is generally arc shaped symmetrical on opposite sides of the back up bar. The flange of each side plate carries member 73 through which the guide rod extends.

When the deflector plates are directly rearward, the intermediate portion of the guide rod between the two members 73 is preferably curved on the arc of a circle having a center at bolt 59. Thus, when cable 19 moves a side plate to its extreme position its member 73 is brought to the back up bar keeping the obliquely disposed side plate against which the silage hits tight against the end of the delivery chute, and silage will not spill out the wrong end of the side plate.

The portions of the guide rod outboard of the side plate members 73, when the plates are disposed rearwardly, is curved on arcs having radii greater than the curve of the intermediate portion. With the guide rod thus made the side plate that is not to deflect silage is moved laterally of the delivery chute. This guide rod coacts with the side plates and the pivot points of the side plates and downplate to move the side plates without their rubbing on the delivery chute. Also, the flanged side plates, guide members thereon, guide rod, back up bar and elongated stationary member constitute means reinforcing the downplate and side plate against the impact force of the blown silage.

The operation of apparatus embodying this invention is automatic once the two handles are set to a selected position and to take up slack in the cables. Handle 24 is set to move downplate 21 to the desired position oblique to the end of the delivery chute so that the silage is suitably deflected downwardly. Then handle 25 is moved to take up slack in cable 19.

In moving the harvester and wagon across a field, crank 32 continuously rotates moving pulley 34 to vary the effective length of cable 19 between pivot axis 16 and the end of the delivery chute through a repeating cycle. This cyclic variation of the length effects an alternate pull and release of that cable to turn the deflector side plates 22 and 23 from one extreme position to the opposite extreme position. When crank 32 turns through 180 degrees it turns side plate 22 clockwise, as viewed from the above, tensioning spring 62. The side plate is moved to the extreme position seen in Fig. 6. During the next 180 degrees turn of the crank, the effective length of the cable is increased whereby spring 62 responds and turns the deflector plates as a unit counterclockwise past the directly rearward position until the side plates have reversed their positions with respect to the delivery chute; that is side plate 23 is then disposed diagonally across the end of the delivery chute. The crank means thus effects movement of the silage sidewise deflectors back and forth evenly spreading the silage discharged into the wagon. As the control linkage is constituted of a first portion extending substantially from the harvester pivot axis 16 to the end of the delivery chute and a second portion extending substantially from that axis to the tractor hitch end of the harvester draft means, the normal relative movement of the harvester crop gathering means 15 with respect to draft means 17 has no effect on the control linkage and thereby has no effect on the deflector means.

When a turn is made in moving the harvester and wagon along a field, a compensating effect is automatically inserted into the control linkage of cable 19. If wagon tongue 48 turns in a clockwise or counterclockwise direction with respect to draft bar 47 of the harvester draft means, the wagon tongue pivots at hitch 41. This relative movement causes bridging bar 46 to pivot at its ends so that it also moves with respect to the draft bar. As a result the effective length of cable 19 between axis 16 and the deflector means at the end of the chute is changed, either shortened or lengthened. This is because lateral member 44 and its attached pulley 42 are moved. Movement of this pulley is in a direction offset from the direction of the effective portion of cable 19. And movement of this pulley pulls or releases the so-called non-effective portion of cable 19. This action aids in deflecting silage in the direction the wagon moves insuring that silage is directed to the wagon. The extent of this compensation is proportional to the extent of relative movement of the wagon to the harvester.

When the wagon is moved to extreme positions to the left, cable 19 is protected from breaking. For this purpose a release means is effective once side plate 23 is at its extreme oblique deflecting position. For movement of the wagon from that point on, lateral arm 44 will pivot on bridging bar 46 stretching spring 53 without pulley 42 moving. Therefore cable 18 is not overtensioned.

Although but a single embodiment of this invention is illustrated and described, modifications thereof will occur to those skilled in the art without departing from the scope of my invention, as defined by the appended claims.

It is claimed and desired to secure as Letters Patent:

1. In combination, a harvesting machine including draft means and crop gathering means carried by said draft means in pivotable relation about an axis thereof, said crop gathering means having a delivery chute at one end of said harvester, said draft means having a tractor hitch at the end of said harvester opposite said delivery chute, baffle means for deflecting material discharged from said chute and control linkage including a cable connected to said baffle means and extending to said opposite end of said harvester with the intermediate portion of said cable being passed substantially to said axis to prevent movement of said crop gathering means relative to said draft means from causing said cable to move said deflector plates, said control linkage including harvester operated and carried means moving said cable to cyclically move said baffle means spreading material discharged from said chute.

2. The combination as claimed in claim 1, wherein said control linkage includes means for preventing said cable from being overtensioned.

3. The combination as claimed in claim 1, wherein said harvester includes hitch means for attaching the tongue of a wagon for the wagon to receive material discharged from said chute, and means carried by said harvester and coacting between said harvester and the tongue of the attached wagon to move said cable in response to movement of said wagon relative to said harvester to move said baffle means aiding in directing said material into said wagon.

4. The combination as claimed in claim 3, wherein said harvester carries means for preventing said coacting means from over tensioning said cable.

5. In combination, a harvesting machine including a material delivery chute, baffle means including first and second plates disposed on opposite sides of said chute, means pivotably connecting said two plates to said chute, means to bias said two plates to one extreme position disposing said first plate oblique to the path of material discharged from said chute deflecting that material to one side, and control linkage carried solely by said harvesting machine connected to said baffle means to act against said bias means to move said two plates to a second position disposing said second plate oblique to the path of said material, said control linkage including harvester operated and carried means for cyclically moving said baffle means back and forth between first and second positions.

6. The combination as claimed in claim 5, wherein said harvester includes hitch means for attaching the tongue of a wagon for the wagon to receive material discharged from said chute, and means carried by said harvester and coacting between said harvester and the tongue of the attached wagon to move said control linkage in response to movement of said attached wagon relative to said harvester to move said baffle means aiding in directing said material into said wagon.

7. The combination as claimed in claim 5, wherein said harvester carries means for preventing said coacting means from over tensioning said cable.

8. In combination with a harvesting machine having a delivery chute, a first plate carried by said chute pivotable about an axis in a plane vertical of the end of said chute, second and third plates constituting vertical baffles disposed on opposite sides of said chute and pivotably carried by said first plate, means to bias said first plate to a first position moving said second plate diagonally of said chute to one side, control means to move said first plate against the action of said bias means to a second position moving said third plate diagonally of said chute to the opposite side, and means carried by said chute to brace and guide said second and third plates in positions diagonal to said chute.

9. The combination as claimed in claim 8, wherein said harvesting machine includes draft means and crop gathering means including said delivery chute carried by said draft means in pivotable relation thereto about a horizontal axis thereof, said plates are disposed at one end of said harvester, and said control means comprising a cable connected to one of said plates and extending to the opposite end of said harvester with the intermediate portion of said cable being passed substantially to said axis to prevent movement of said crop gathering means relative to said draft means from causing said cable to move said plates.

10. The combination as claimed in claim 8, wherein hinge means is attached transversely of the end of said chute and includes a hinge plate, a second bias means provided to move said hinge plate to a position oblique to said chute about a generally horizontal axis transverse to said chute, said first plate is carried by said hinge plate, and control linkage includes a cable connected to said hinge plate to act against said second bias means to move said hinge plate.

11. The combination as claimed in claim 8, wherein said harvesting machine includes draft means and crop gathering means including said delivery chute carried by said draft means in pivotable relation thereto about a horizontal axis thereof, said plates are disposed at one end of said harvester, hinge means is attached transversely of the end of said chute and includes a hinge plate, a second bias means provided to move said hinge plate to a position oblique to said chute about a generally horizontal axis transverse to said chute, said first plate is carried by said hinge plate, and control linkage includes a cable connected to said hinge plate to act against said second bias means to move said hinge plate and extending to the opposite end of said harvester with the intermediate portion of said cable being passed substantially to said axis to prevent movement of said crop gathering means relative to said draft means from causing said cable to move said plates.

12. The combination as claimed in claim 8, wherein said control means includes means for cyclically moving said plates back and forth between said first and second positions.

13. The combination as claimed in claim 8, wherein said harvesting machine includes means for attaching a wagon to receive material discharged from said chute, and means coacting between said harvester and an attached wagon to move said control means in response to movement of said attached wagon relative to said harvester to effect movement of said plates compensating for that relative movement to direct material from said chute into said wagon.

14. In combination with a harvesting machine comprising draft means and crop gathering means carried by said draft means in pivotable relation thereto about a first horizontal axis thereof, said crop gathering means having a delivery chute at one end of said harvesting machine, a first plate being attached for pivotable movement about a second axis disposed horizontal transverse to said chute with a first bias means to move said first plate in one direction about said second axis, means carried by said chute for pivotably carrying said first plate about a third axis disposed in a plane vertical of the end of said chute comprising a hinge plate having a round raised portion with said third axis at the center thereof and said first plate having a round opening journaled to said raised portion, second and third plates constituting vertical baffles disposed on opposite sides of said chute in pivotable relation to said first plate, a second bias means to move said first plate to a first position disposing said second plate diagonally of said chute to one side, a cable to move said first plate against the action of said second bias means to a second position disposing said third plate diagonally of said chute to the opposite side, and means carried by said chute to brace and guide said second and third plates in positions diagonal of said chute, a second cable to move said hinge plate about said second axis against the action of said first bias means, said two cables extending from the end of said chute to the opposite end of said harvester, and means disposed substantially at said first axis through which the intermediate portion of said two cables are passed, whereby to prevent movement of said crop gathering means relative to said draft means from causing said cables to move said plates.

15. The combination as claimed in claim 14, wherein a continuously harvester operated means coacts with said first cable to cyclically move said first plate against said second bias means.

16. The combination as claimed in claim 14, wherein said harvester includes means for attaching a wagon for receiving material discharged from said chute, and means coacting between said harvester and an attached wagon to move said first cable in response to movement of said wagon relative to said harvester to move said first plate to aid in directing said material into said wagon.

17. The combination as claimed in claim 14, wherein means is provided for preventing said first cable from being overtensioned.

18. In combination, a harvester including draft means and crop gathering means carried by said draft means in pivotable relation about an axis thereof, said crop gathering means having a delivery chute at one end of said harvester, said draft means having a tractor hitch at the end of said harvester opposite said delivery chute, baffle means for deflecting material discharged from said chute and control linkage including a cable connected to said baffle means and extending to said opposite end of said harvester with the intermediate portion of said cable being passed substantially to said axis to prevent movement of said crop gathering means relative to said draft means from causing said cable to move said deflector plates, said baffle means including first and second plates disposed on opposite sides of said chute, means common to said two plates pivotably connecting said two plates to said chute and means to bias said two plates to one position disposing said first plate oblique to the path of material discharged from said chute and said second plate out of the path of said material deflecting that material to one side, and said cable is connected to said baffle means to act against said bias means to move said plates to a second position disposing said second plate oblique to the path of said material and said first plate out of the path of said material deflecting that material to the other side of said chute.

References Cited in the file of this patent

UNITED STATES PATENTS

| | | |
|---|---|---|
| 1,306,462 | Bergerud | June 10, 1919 |
| 1,313,741 | Scanlan | Aug. 19, 1919 |
| 2,377,760 | Court | June 5, 1945 |
| 2,465,156 | Huddle | Mar. 22, 1949 |
| 2,477,795 | Gehl | Aug. 2, 1949 |
| 2,661,585 | Hansen | Dec. 8, 1953 |

OTHER REFERENCES

Papec Forage Harvesters Publication, Jan. 11, 1951.